(12) United States Patent
LaCrosse

(10) Patent No.: US 11,578,778 B2
(45) Date of Patent: Feb. 14, 2023

(54) FLOW SUPPRESSION DEVICE

(71) Applicant: William R. LaCrosse, Alpharetta, GA (US)

(72) Inventor: William R. LaCrosse, Alpharetta, GA (US)

(*) Notice: Subject to any disclaimer, the term of this patent is extended or adjusted under 35 U.S.C. 154(b) by 886 days.

(21) Appl. No.: 16/432,758

(22) Filed: Jun. 5, 2019

(65) Prior Publication Data
US 2019/0376577 A1 Dec. 12, 2019

Related U.S. Application Data

(60) Provisional application No. 62/681,831, filed on Jun. 7, 2018.

(51) Int. Cl.
| | | |
|---|---|---|
| *F16F 13/10* | (2006.01) | |
| *F16F 13/18* | (2006.01) | |
| *F16K 17/02* | (2006.01) | |
| *E03B 9/18* | (2006.01) | |
| *A62C 37/50* | (2006.01) | |
| *B05B 1/26* | (2006.01) | |

(Continued)

(52) U.S. Cl.
CPC .............. *F16F 13/10* (2013.01); *A62C 37/50* (2013.01); *B01D 29/27* (2013.01); *B01D 35/02* (2013.01); *B05B 1/26* (2013.01); *B65D 31/02* (2013.01); *E03B 7/09* (2013.01); *E03B 9/18* (2013.01); *F16F 13/18* (2013.01); *F16K 17/02* (2013.01); *B01D 29/0054* (2013.01); *B01D 29/0059* (2013.01)

(58) Field of Classification Search
CPC ........... F16F 13/10; F16F 13/18; A62C 37/50; B01D 29/27; B01D 35/02; B01D 29/0054; B01D 29/0059; B05B 1/26; B65D 31/02; E03B 7/09; E03B 9/18; F16K 17/02
USPC ........ 239/462; 210/448, 449, 232, 238, 315, 210/460, 461
See application file for complete search history.

(56) References Cited

U.S. PATENT DOCUMENTS 3,762,565 A * 10/1973 Okuniewski ........ F16L 37/0925
                                                  210/460
4,098,698 A *  7/1978 Lamothe ................. E21B 21/12
                                                  210/449

(Continued)

FOREIGN PATENT DOCUMENTS

WO    WO 2005/049929 A1 *  6/2005

*Primary Examiner* — Fred Prince
(74) *Attorney, Agent, or Firm* — Welsh Flaxman & Gitler LLC

(57) ABSTRACT

A flow suppression device adapted to be connected to a high pressure fluid system includes an outer flow containment member of a porous and flexible construction. The outer flow containment member has an upstream end and a downstream end opposite the upstream end. The upstream end includes an inlet opening adapted to receive a flow stream of pressurized fluid from the high pressure fluid system and the downstream end being substantially closed. The flow suppression device also includes a primary inner flow containment member of a porous and flexible construction contained within the outer flow containment member. The primary inner flow containment member has an upstream end with an inlet opening adjacent the inlet opening of the outer flow containment member and a downstream end opposite the upstream end of the primary inner flow containment member.

18 Claims, 12 Drawing Sheets

(51) Int. Cl.
  *B01D 29/27* (2006.01)
  *B01D 35/02* (2006.01)
  *B01D 29/00* (2006.01)
  *B65D 30/08* (2006.01)
  *E03B 7/09* (2006.01)

(56) References Cited

U.S. PATENT DOCUMENTS

| | | |
|---|---|---|
| 6,056,211 A | 5/2000 | DiLoreto |
| 6,227,463 B1 | 5/2001 | Porter |
| 6,908,549 B2 * | 6/2005 | Middleton ............ E03F 5/0401 210/232 |
| 9,010,656 B2 | 4/2015 | Cowin |

* cited by examiner

FLOW SUPPRESSION DEVICE

CROSS REFERENCE TO RELATED APPLICATION

This application claims the benefit of U.S. Provisional Patent Application Ser. No. 62/681,831, entitled "FLOW SUPPRESSION DEVICE," filed Jun. 7, 2018.

BACKGROUND OF THE INVENTION

1. Field of the Invention

The invention relates generally to devices and methods for diverting fluid flow, and particularly to devices and methods for suppressing water flow from fire hydrants, fire pumps and the like when testing or flushing.

2. Description of the Related Art

Water supply systems frequently require testing and purging to comply with local ordinances, operational requirements or safety codes. A perfect example is testing of fire hydrants. Regular testing and purging is required. Fire pumps installed in buildings for fire protection systems also require annual flow testing to meet with fire and safety code requirements.

To test a typical system, temporary hoses are attached to an available connection and the water is released. A playpipe or flow diverter is connected to the end of the hose to allow flow measurements at the exiting water stream. A measurement device, typically a Pitot tube, determines the flow of exiting water. The water is often discharged in the immediate vicinity of the building wall or hydrant. When water under high pressure is released to atmospheric pressure, considerable forces are in play on the discharge stream. Typically the playpipe or flow diverter needs to be restrained during testing. Care must be exercised with regard to where the water is discharged. Damage to the ground, surrounding landscaping, and harm to individuals in the path of the water can occur due to a misdirected water stream.

Some tests are performed on building roofs where the device needs to be manually carried up stairs. The portability of the flow diverter is of concern to the operator that has to carry the device. Rooftop tests are seldom available with suitable anchoring positions.

As safety codes and standards have improved over the years, accuracy in testing is of an increasing importance. Accuracy of many current flow diverters has been sacrificed to accommodate for other features. Many currently employ a restricted position Pitot tube feature which does not allow movement of the Pitot tap location once in use, which is accurate only if the discharge follows a perfect velocity profile. Flow streams, however, seldom follow perfect velocity profiles. A fixed position Pitot tube device is never as accurate as an unrestricted access system allowing a qualified operator to seek the most representative velocity pressure reading to determine the flow. Accordingly, a device that provides unrestricted access to the flow stream for an operator will provide for more accurate results.

The difficulty of providing unrestricted access is that water back splash is difficult to control. The difficulty increases as the size of the device reduces. Needless to say, an unrestricted access flow diverter must allow the operator access without getting him wet in the process. The device should prevent any back splash of the fluid in the area where access is required.

Accordingly, a need exists to provide a small, accessible, portable flow diverter and suppression system that will dissipate the energy contained in fluid systems to allow for a safe discharge of the flow on any surface without requiring restraints while allowing an operator to obtain an undisturbed access for the highest accuracy flow measurement readings while not getting wet.

SUMMARY OF THE INVENTION

It is, therefore, an object of the present invention to provide a flow suppression device adapted to be connected to a high pressure fluid system. The flow suppression device includes an outer flow containment member of a porous and flexible construction. The outer flow containment member has an upstream end and a downstream end opposite the upstream end. The upstream end includes an inlet opening adapted to receive a flow stream of pressurized fluid from the high pressure fluid system and the downstream end being substantially closed. The flow suppression device also includes a primary inner flow containment member of a porous and flexible construction contained within the outer flow containment member. The primary inner flow containment member has an upstream end with an inlet opening adjacent the inlet opening of the outer flow containment member and a downstream end opposite the upstream end of the primary inner flow containment member.

It is also an object of the present invention to provide a flow suppression device wherein the outer flow containment member is composed of a porous fabric bag.

It is another object of the present invention to provide a flow suppression device wherein the downstream end of the outer flow containment member includes at least one opening with a fastener.

It is a further object of the present invention to provide a flow suppression device wherein the outer flow containment member includes a top wall and a bottom wall connected by an upstream wall adjacent the upstream end of the outer flow containment member and a downstream wall adjacent the downstream end of the outer flow containment member.

It is also an object of the present invention to provide a flow suppression device wherein the primary inner flow containment member includes a top wall and a bottom wall connected by an upstream wall adjacent the upstream end of the primary inner flow containment member and a downstream wall adjacent the downstream end of the primary inner flow containment member.

It is another object of the present invention to provide a flow suppression device wherein the inlet opening includes a drawstring for encircling the high pressure fluid system.

It is a further object of the present invention to provide a flow suppression device wherein the inlet opening includes a plurality of carabiners shaped and dimensioned for selective engagement with connecting members of the high pressure fluid system.

It is also an object of the present invention to provide a flow suppression device wherein primary inner flow containment member is composed of a porous fabric bag.

It is another object of the present invention to provide a flow suppression device wherein the inlet opening of the outer flow containment member and the inlet opening of the primary inner flow containment member are secured together and are coextensive to function as a single inlet opening.

It is a further object of the present invention to provide a flow suppression device including a secondary inner flow containment member of a porous and flexible construction contained within the primary inner flow containment member, the secondary inner flow containment member includes an upstream end with an inlet opening adjacent the inlet opening of the outer flow containment member and a downstream end opposite the upstream end, and the inlet opening of the secondary inner flow containment member and the inlet opening of the outer flow containment member are secured together and are coextensive.

It is also an object of the present invention to provide a flow suppression device wherein the primary inner flow containment member is of a size to create a space between the primary inner flow containment member and the outer flow containment member which defines a cavity when filled with fluid.

It is another object of the present invention to provide a flow suppression device wherein the secondary inner flow containment member is composed of a porous fabric bag.

It is a further object of the present invention to provide a flow suppression device wherein the inlet opening of the secondary inner flow containment member and the inlet opening of the outer flow containment member are secured together and are coextensive to function as a single inlet opening.

It is also an object of the present invention to provide a flow suppression device including a non-porous primary inner flow containment member contained within the outer flow containment member which controls the flow of fluid.

It is another object of the present invention to provide a flow suppression device wherein the non-porous primary inner flow containment member includes an aperture for the flow of fluid therethrough along a lateral wall thereof.

It is a further object of the present invention to provide a flow suppression device wherein the outer flow containment member has a first porosity and the primary inner flow containment member has a second porosity which is different from the first porosity.

It is also an object of the present invention to provide a flow suppression device wherein the second porosity is less than the first porosity.

It is another object of the present invention to provide a flow suppression device including a handle.

Other objects and advantages of the present invention will become apparent from the following detailed description when viewed in conjunction with the accompanying drawings, which set forth certain embodiments of the invention.

DESCRIPTION OF THE PREFERRED EMBODIMENTS

Figure 1:
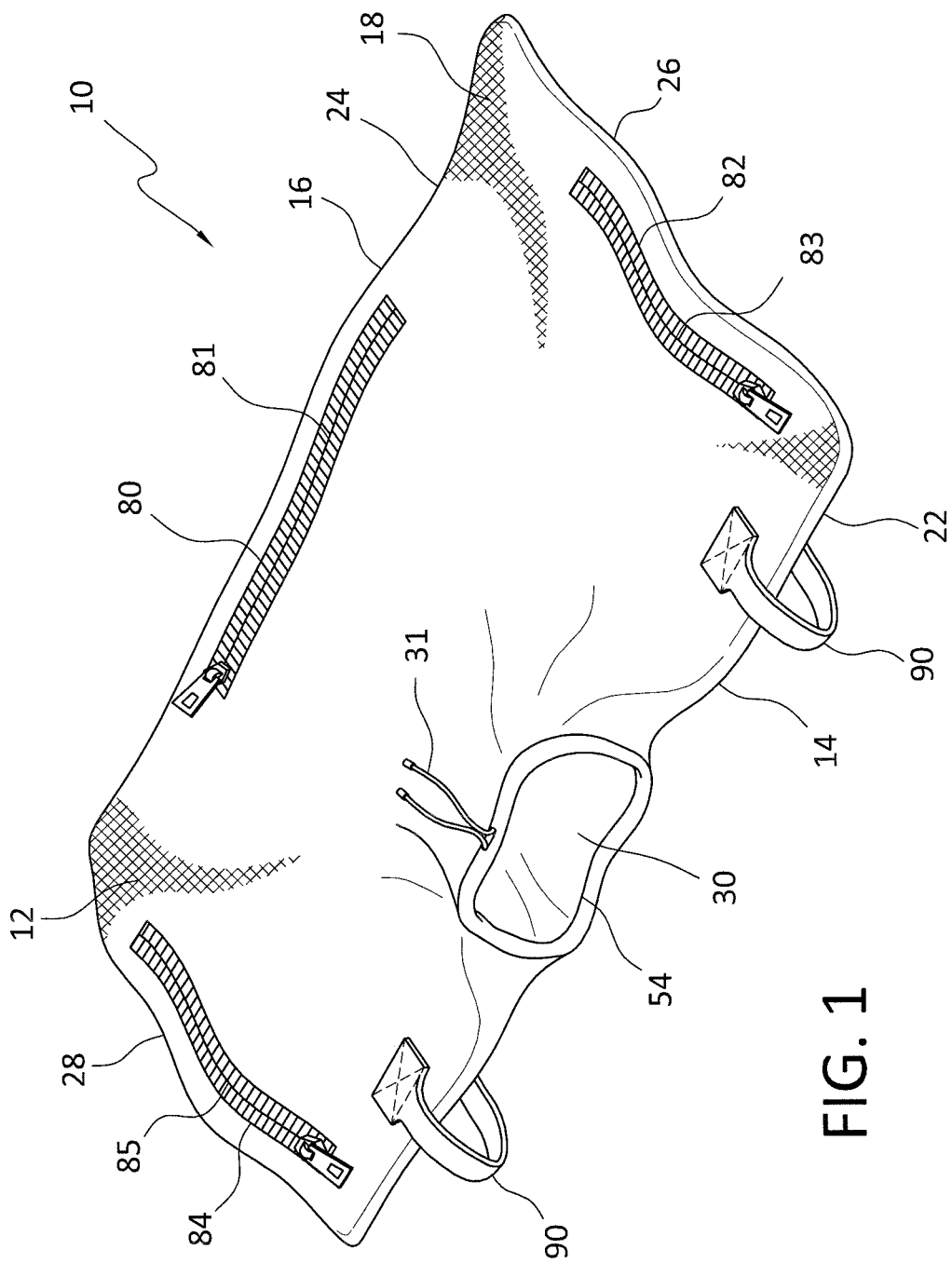
FIG. 1 is a perspective view of a flow suppression device in accordance with the present invention.
Figure 2:
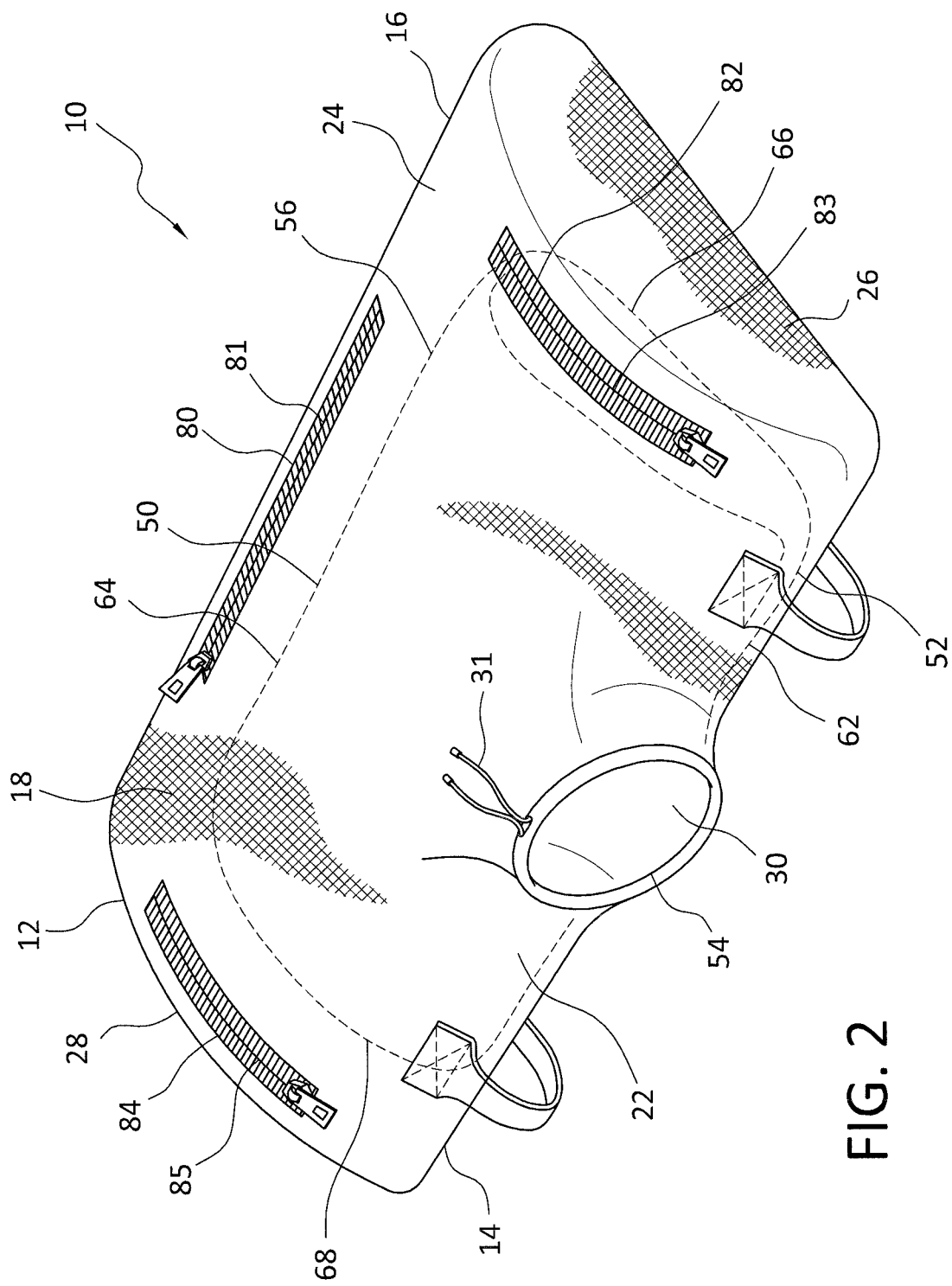
FIG. 2 is top perspective view of the flow suppression device shown in FIG. 1.

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as a basis for teaching one skilled in the art how to make and/or use the invention.

Referring to the various figures, various embodiments of a flow suppression device are disclosed. As will be explained below in detail, the flow suppression device takes advantage of the water flow characteristics of a porous fabric to achieve ideal flow suppression of water coming from a pressurized source, such as, a fire hydrant. The flow suppression device disburses an initial flow stream of pressurized fluid from a source of pressurized fluid. As will be appreciated based upon the following disclosure, the flow suppression device comprises a containment system composed of a plurality of containment members generally in the shape of a bag with an open end. The plurality of members offers guidance or resistance to the fluid as it travels through the flow suppression device to finally exit through selected exit openings or directly through the containment system itself. The fluid velocity is reduced to minimal levels before exiting out of the flow suppression device. The exit direction is omnidirectional or can be selected without need to orient the inlet location.

As used herein, the term "flow stream of pressurized fluid" refers to a moving fluid, including but not limited to water and other liquids, air and other gases, and combinations thereof, to which a force or pressure has been applied.

As used herein, the term "source of pressurized fluid" refers to a device adapted to convey a flow stream of pressurized fluid as defined above. The term "source of pressurized fluid" includes, but is not limited to, hoses, pipes, tubes, manifolds and other similar devices. The term "source of pressurized fluid" also includes, but is not limited to, fire hydrants, fire pumps and other similar devices.

The flow suppression device 10 is adapted to be connected to a high pressure fluid system such as a fire hydrant 100, a fire pump or the like to be tested. A source of pressurized fluid, for example, a hose 102, with a flow diverter 104 connected to and extending therefrom connects the flow suppression device 10 to the high pressure fluid system 100. The free end of hose 102 opposite the flow diverter 104 is connected to the fire hydrant 100, while the flow suppression device 10 is secured to the flow diverter in a manner disclosed below in greater detail. In accordance with a preferred embodiment, the flow diverter is as disclosed in U.S. Pat. No. 7,137,568, entitled "APPARATUS AND METHOD FOR FLOW DIVERTER," which is incorporated herein by reference. The hose 102 is adapted to convey a flow stream of pressurized fluid to the flow diverter 104 for ultimate conveyance through the flow suppression device 10 where the flow stream coming from the flow diverter 104 is depressurized and diverted for discharge.

As briefly explained above, the flow suppression device 10 makes use of a plurality of containment members preferably in the form of bags to control the flow of fluid therethrough. Each embodiment requires at least an outer flow containment member 12 and a primary inner flow containment member 50. As described in an additional embodiment presented below, more than one inner flow containment member may be used in conjunction with the present invention.

In accordance with a first embodiment, the flow suppression device 10 comprises an outer flow containment member 12 having an upstream end 14 and a downstream end 16 opposite the upstream end 14. The outer flow containment member 12 is generally composed of a porous fabric bag having an open end allowing for the controlled flow of fluid into the open end and the subsequent flow of the fluid through the porous fabric. The outer flow containment member 12 is designed to have a weave density and fabric area allowing the fluid to escape through the pores at contained, low velocities.

As will be appreciated based upon the following disclosure, the outer flow containment member 12 is of a flexible, non-rigid construction and may therefore be folded and configured into various arrangements. While a specific shape is disclosed herein, it is well appreciated the shape of the outer flow containment member 12 may be varied within the spirit of the present invention. The shape can be in any form desired, but of a size large enough to allow the high energy fluid stream to dissipate against itself within the outer flow containment member 12 and then flow through the pores of the fabric of the outer flow containment member 12 or through an opening 81, 83, 85 (as described below in more detail) which may be opened and closed by zippers 80, 82, 84 (or hook and loop fasteners) in the outer flow containment member 12 to provide for designed directional discharge.

Figure 3:
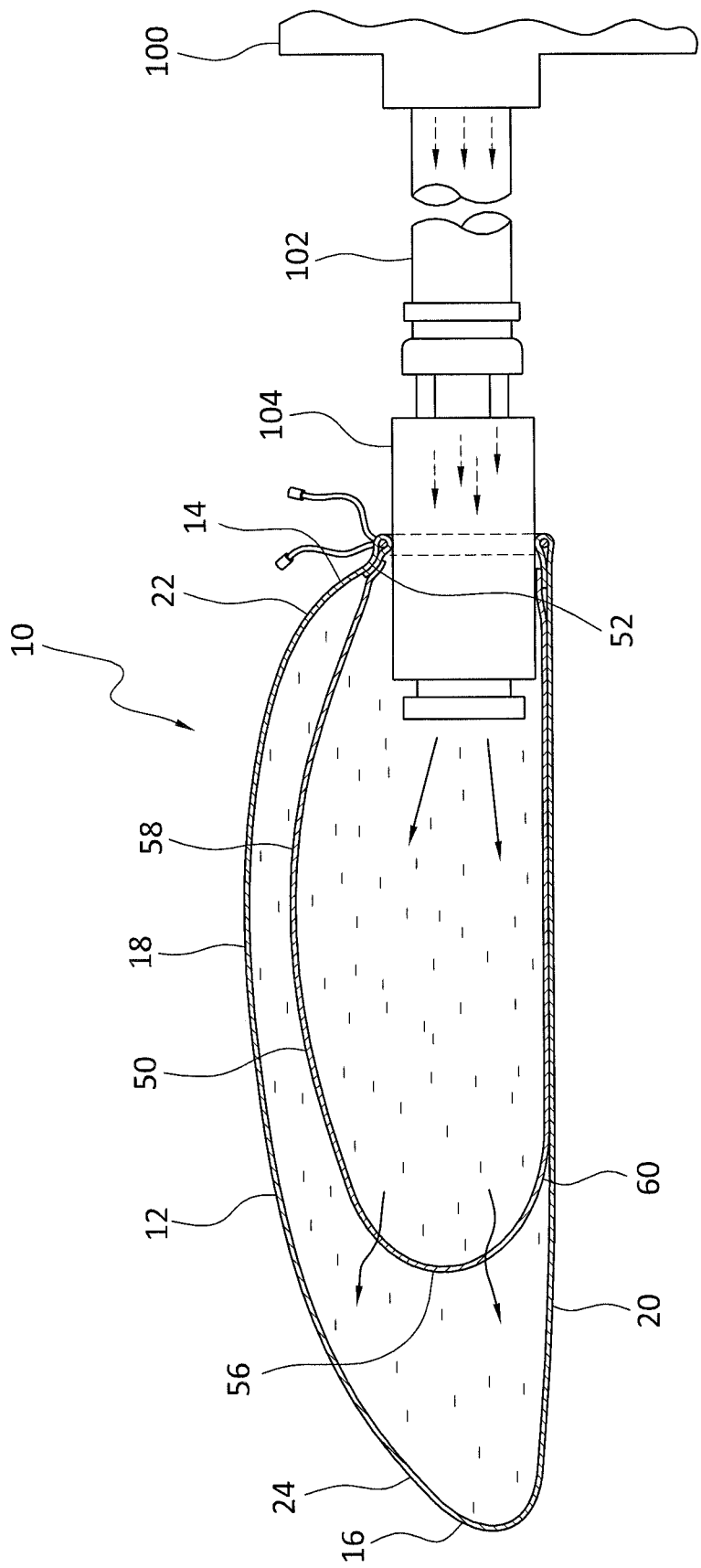
FIG. 3 is a cross-sectional view of the flow suppression device shown in FIG. 1 showing the flow suppression device in use.
Figure 4:
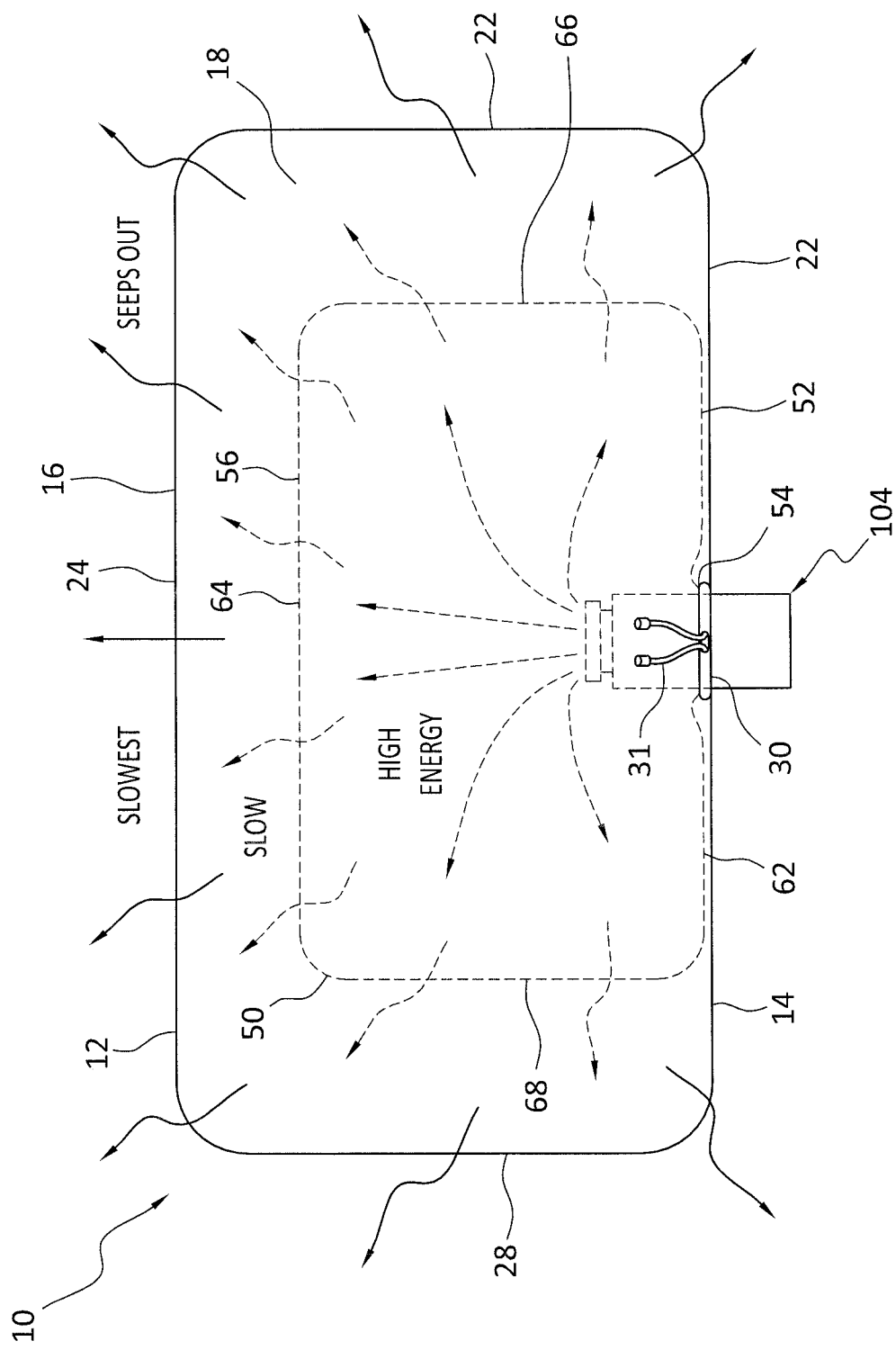
FIG. 4 is a top plan view of the flow suppression device shown in FIG. 1 showing the flow suppression device in use.
Figure 5:
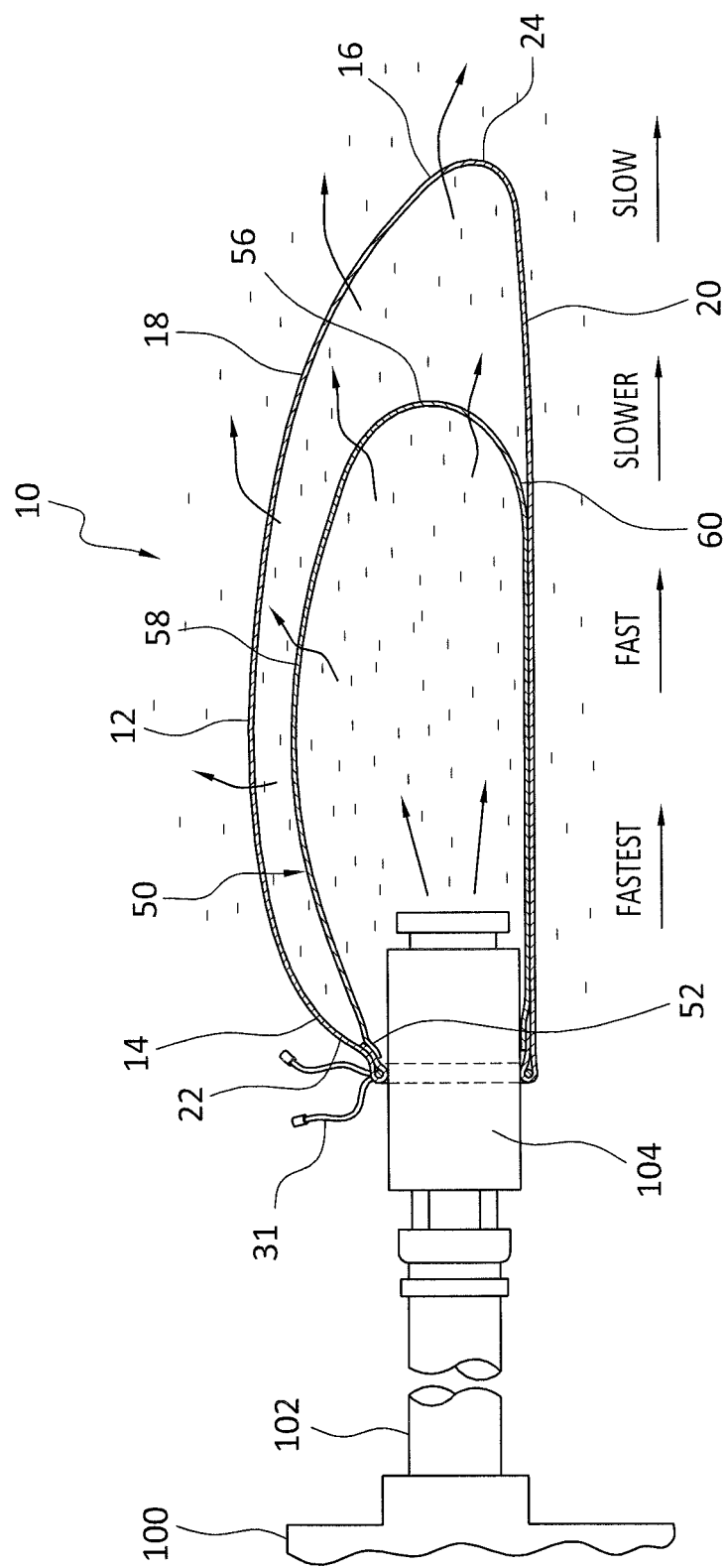
FIG. 5 is a cross-sectional view of the flow suppression device shown in FIG. 1 showing the flow suppression device in use.

In accordance with a disclosed embodiment, when the outer flow containment member 12 is filled with a flow stream of pressurized fluid it takes a generally elliptical cross-sectional configuration (as shown in FIGS. 3 and 5) along the axis extending between the upstream end 14 of the outer flow containment member 12 and the downstream end 16 of the outer flow containment member 12. The outer flow containment member 12 as shown therefore includes a top wall 18 and a bottom wall 20 connected by an upstream wall 22 adjacent the upstream end 14 of the outer flow containment member 12 and a downstream wall 24 adjacent the downstream end 16 of the outer flow containment member 12. When viewed in the top or bottom plan view, the outer flow containment member 12 exhibits a substantially rectangular shape with the upstream wall 22, the downstream wall 24, and lateral walls 26, 28 extending between the upstream wall 22 and the downstream wall 24.

The upstream end 14 is adapted to be removable attached to the flow diverter 104 extending from hose 102 and includes an inlet opening 30 which is adapted to receive the flow stream of pressurized fluid from the hose 102. The inlet opening 30 includes a drawstring 31 for encircling the inlet end of the flow diverter 104 with the remainder of the flow diverter 104 positioned within the outer flow containment member 12. The drawstring 31 allows the inlet opening 30 to be selectively constricted so as to form and engage to the inlet end of the flow diverter 104 in a manner securing the inlet opening 30 thereto.

Figure 6:
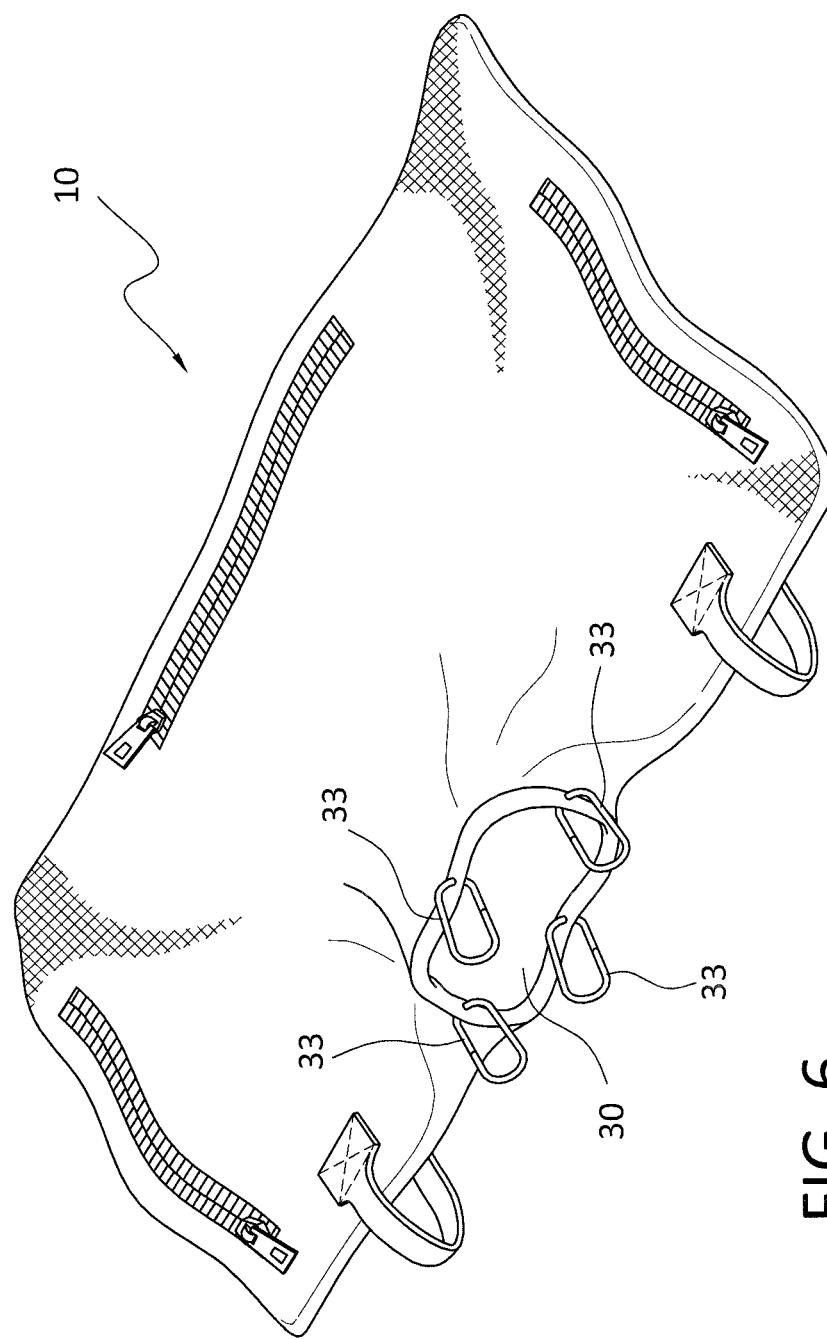
FIG. 6 is a perspective view of an alternate embodiment of the flow suppression device.

In accordance with an alternate embodiment as shown with reference to FIG. 6, the inlet opening 30 may include a plurality of connecting members (for example, carabiners) 33 shaped and dimensioned for selective engagement with connecting members secured at the inlet end of the flow diverter 104. With the exception of zippered openings 81, 83, 85, which are discussed below in detail, the downstream wall 24 and the lateral walls 26, 28 of the outer flow containment member 12 are closed.

A primary inner flow containment member 50 is contained within the outer flow containment member 12. The primary inner flow containment member 50 is also generally composed of a porous fabric bag having an open end allowing for the controlled flow of fluid into the open end and the subsequent flow of the fluid through the porous fabric. The primary inner flow containment member 50 includes an upstream end 52 with an inlet opening 54 adjacent the inlet opening 30 of the outer flow containment member 12 and a downstream end 56 opposite the upstream end 52. In fact, the inlet opening 54 and the inlet opening 30 are secured together and are therefore coextensive to function as a single inlet opening.

As with the outer flow containment member 12, the primary inner flow containment member 50 is of a flexible, non-rigid construction and may therefore be folded and configured into various arrangements. While a specific shape is disclosed herein, it is well appreciated the shape of the primary inner flow containment member 50 may be varied within the spirit of the present invention as long as the size of the primary inner flow containment member 50 is smaller than the outer flow containment member 12. The primary inner flow containment member 50 must be of a size to create a space S between primary inner flow containment member 50 and the outer flow containment member 12 which defines a cavity when filled with fluid. The shape can be in any form desired, but of a size large enough to allow the high energy fluid stream to dissipate against itself within the primary inner flow containment member 50 and then flow through the pores of the fabric of the primary inner flow containment member 50 to contact the fluid in the cavity between the outer flow containment member 12 and the primary inner flow containment member 50 which has not exited and is built up in the outer flow containment member 12 to form a fluid wall.

In accordance with a disclosed embodiment, when the primary inner flow containment member 50 is filled with a flow stream of pressurized fluid it takes a generally elliptical cross-sectional configuration along the axis extending between the upstream end 52 of the primary inner flow containment member 50 and the downstream end 56 of the primary inner flow containment member 50. As such, the primary inner flow containment member 50 includes a top wall 58 and a bottom wall 60 connected by an upstream wall 62 adjacent the upstream end 52 of the primary inner flow containment member 50 and a downstream wall 64 adjacent the downstream end 56 of the primary inner flow containment member 50. When viewed in the top or bottom plan view, the primary inner flow containment member 50 exhibits a substantially rectangular shape with the upstream wall 62, the downstream wall 64, and lateral walls 66, 68 extending between the upstream wall 62 and the downstream wall 64.

In accordance with the operation of the present flow suppression device 10, pressurized fluid enters the inlet opening 54 of the primary inner flow containment member 50. Because of the controlled porosity of the primary inner flow containment member 50, the pressurized fluid begins to fill the primary inner flow containment member 50. When a pressure sufficient to force fluid through the fabric from which the primary inner flow containment member 50 is achieved, fluid begins flowing through and out of the primary inner flow containment member 50 into the cavity between the primary inner flow containment member 50 and the outer flow containment member 12. As fluid continues to flow into the primary inner flow containment member 50 and pass therethrough into the outer flow containment member 12, the outer flow containment member 12 will also fill with fluid until a specific pressure is reached at which time the fluid will then flow through the fabric of the outer flow containment member 12 and out into the external environment. As the fluid progresses through the flow suppression device 10 in this manner the high velocities are reduced within the flow suppression device 10 to allow slow, laminar flow exiting the flow suppression device 10, through the pores in the fabric material of the outer flow containment member 12. By way of this construction, it is possible to control the flow of fluid in a manner desirable when releasing water from fire hydrants, so that the water does not destroy the area surrounding the fire hydrant 100. Further control of the flow of fluid may be achieved by controlling the porosity of the various flow containment members. For example, it might be desirable for the porosity of the flow containment members to decrease as the fluid moves from the diverter toward the outer containment member. Accordingly, the outer flow containment member 12 could have a porosity which is less than the porosity of the primary inner flow containment member 50 resulting in a flow suppression device with flow containment members of different porosities In accordance with another embodiment as presented with reference to FIGS. 7 and 12, the flow suppression device 10 comprises an outer flow containment member 12 as described above, a primary inner flow containment member 50 as described above, and a secondary inner flow containment member 51 contained within the primary inner flow containment member 50. While one inner flow containment member is disclosed with reference to the embodiment of FIGS. 1 to 6 and two inner flow containment members are disclosed with reference to the embodiment of FIGS. 7 to 12, it is appreciated additional inner flow containment members may be used to control fluid flow as dictated by various uses.

The secondary inner flow containment member 51 is also generally composed of a porous fabric bag having an open end allowing for the controlled flow of fluid into the open end and the subsequent flow of the fluid through the porous fabric. The secondary inner flow containment member 51 includes an upstream end 53 with an inlet opening 55 adjacent the inlet opening 30 of the outer flow containment member 12 and a downstream end 57 opposite the upstream end 53. As with the inlet opening 54 of the primary inner flow containment member 50, the inlet opening 55 of the secondary inner flow containment member 51 and the inlet opening 30 of the outer flow containment member 12 are secured together and are therefore coextensive to function as a single inlet opening.

As with the outer flow containment member 12, the secondary inner flow containment member 51 is of a flexible, non-rigid construction and may therefore be folded and configured into various arrangements. While a specific shape is disclosed herein, it is well appreciated the shape of the secondary inner flow containment member 51 may be varied within the spirit of the present invention as long as the size of the secondary inner flow containment member 51 is smaller than the primary inner flow containment member 50. The secondary inner flow containment member 51 must be of a size to create a space S1 between primary inner flow containment member 50 and the secondary inner flow containment member 51 which defines a cavity when filled with fluid. The shape can be in any form desired, but of a size large enough to allow the high energy fluid stream to dissipate against itself within the secondary inner flow containment member 51 and then flow through the pores of the fabric of the secondary inner flow containment member 51 into contact with the fluid in the cavity between the primary inner flow containment member 50 and the secondary inner flow containment member 51 which has not yet exited and is built up in the primary inner flow containment member 50 to form a fluid wall.

In accordance with a disclosed embodiment, when the secondary inner flow containment member 51 is filled with a flow stream of pressurized fluid it takes a generally elliptical cross-sectional configuration along the axis extending between the upstream end 53 of the secondary inner flow containment member 51 and the downstream end 57 of the primary inner flow containment member 50. As such, the secondary inner flow containment member 51 includes a top wall 59 and a bottom wall 61 connected by an upstream wall 63 adjacent the upstream end 53 of the secondary inner flow containment member 51 and a downstream wall 65 adjacent the downstream end 57 of the primary inner flow containment member 50. When viewed in the top or bottom plan view, the secondary inner flow containment member 51 exhibits a substantially rectangular shape with the upstream wall 63, the downstream wall 65, and lateral walls 67, 69 extending between the upstream wall 63 and the downstream wall 65.

As such, and in accordance with the operation of the flow suppression device, pressurized fluid enters the inlet opening 55 of the secondary inner flow containment member 51. Because of the controlled porosity of the secondary inner flow containment member 51, the pressurized fluid begins to fill the secondary inner flow containment member 51. When a pressure sufficient to force fluid through the fabric from which the secondary inner flow containment member 51 is constructed is achieved, fluid begins flowing through and out of the secondary inner flow containment member 51 into the cavity between the secondary inner flow containment member 51 and the primary inner flow containment member 50. As fluid continues to flow into the secondary inner flow containment member 51 and passes therethrough into the primary inner flow containment member 50, the primary inner flow containment member 50 will also fill with water until a specific pressure is reached at which time the fluid will then flow through the fabric of the primary inner flow containment member 50 and into the cavity between the primary inner flow containment member 50 and the outer flow containment member 12. As fluid continues to flow into the primary inner flow containment member 50 and passes therethrough into the outer flow containment member 12, the outer flow containment member 12 will also fill with water until a specific pressure is reached at which time the fluid will then flow through the fabric of the outer flow containment member 12 and seeps out into the external environment. As the fluid progresses through the flow suppression device 10 in this manner the high velocities are reduced within the flow suppression device 10 to allow slow, laminar flow exiting the flow suppression device 10, through the pores in the fabric material of the outer flow containment member 12. By way of this construction, it is possible to control the flow of fluid in a manner desirable when releasing water from fire hydrants, so that the water does not destroy the area surrounding the fire hydrant 100. Further control of the flow of fluid may be achieved by controlling the porosity of the various flow containment members. For example, it might be desirable for the porosity of the flow containment members to decrease as the fluid moves from the diverter toward the outer containment member.

It is appreciated that it might be desirable to pre-charge the cavities defined by space S and S1 between the secondary inner flow containment member 51, the primary inner flow containment member 50, and the outer flow containment member 12. That is, fluid is forced at a lower pressure into and through the secondary inner flow containment member 51, the primary inner flow containment member 50, and the outer flow containment member 12 until the cavities defined by the spaces S and S1 between the secondary inner flow containment member 51, the primary inner flow containment member 50, and the outer flow containment member 12 are substantially filled. Thereafter, the fluid pressure may be increased to full pressure without fear that the containment members might burst under the sudden increase in pressure that would occur upon the filling of the empty flow suppression device with fluid at full pressure. Pre-charging provides a resistance force of water at low velocity that will counteract the kinetic energy of the flow stream entering the flow suppression device. The high velocity water exits the flow diverter 104 into the containment area defined by secondary inner flow containment member 51 and collides with the fluid at low velocity. The resultant collisions cancel each other to slow the combined fluid stream. The flow stream further relies upon cavities filled with fluid that it must flow through to further transform and convert almost all the kinetic energy to other forms of energy. The back pressure supplied by the secondary and primary inner flow containment members 50, 51 has been determined to improve their effectiveness if they are separated from each other by spaces S and S1 for better conversion of the fluid velocity as the conversion process takes place. A unique feature of the process is that a Venturi effect occurs at the inlet 54 of the primary inner flow containment member 50 that reduces the atmospheric pressure slightly causing air to be drawn inside the primary inner flow containment member 50 to mix with the fluid stream. The mixture of air into the stream has the effect to aerate the fluid stream to improve the effectiveness of the device in breaking down the velocity of the fluid stream. In an embodiment including a secondary inner flow containment member 51 the Venturi effect will occur at inlet 55 instead of inlet 54.

As discussed above, the outer flow containment member 12 also includes openings 81, 83, 85 along the downstream wall 24 and the lateral side walls 26, 28. The openings 81, 83, 85 may be selectively opened and closed through the actuation of closable fasteners in the form of zippers 80, 82, 84 (or hook and loop fasteners) associated with the opening 81, 83, 85. The zippers 80, 82, 84 may be opened to release pressure within the outer flow containment member 12 in the event it is desired to allow a greater flow of fluid from the flow suppression device 10 or control the specific direction of flow of fluid from the flow suppression device 10.

Figure 12:
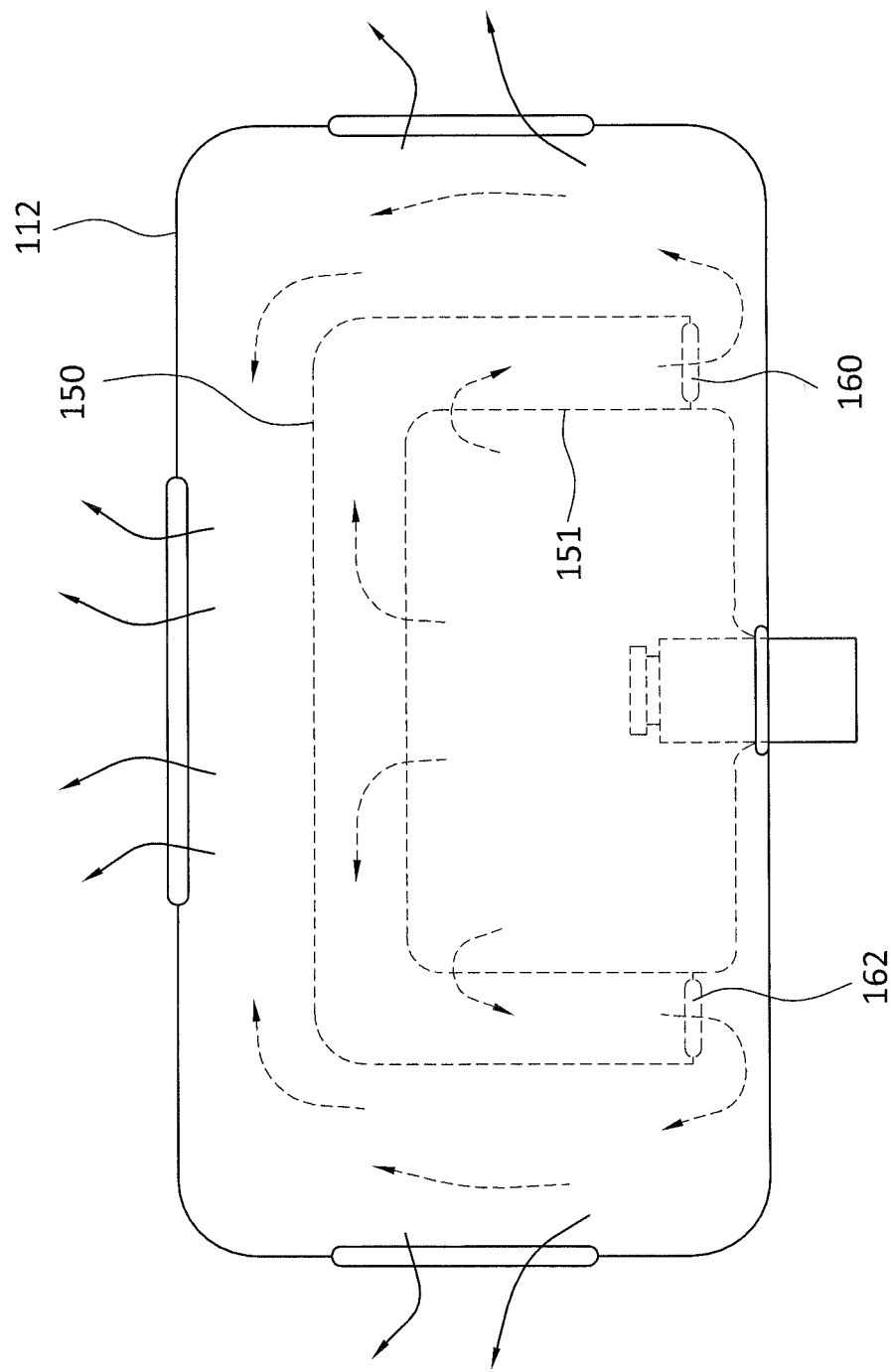
FIG. 12 is a top plan view of an alternate flow suppression device in accordance with the present invention.

In accordance with an alternate embodiment with the present invention, and with reference to FIG. 12, the flow of fluid through the secondary inner flow containment member 151, the primary inner flow containment member 150, and the outer flow containment member 112 can be controlled through the provision of a non-porous primary inner flow containment member 150 which would function as a diverter or baffle system to control the flow of fluid, forcing it along a maze-like pathway, so as to slow and control its flow to the wall of the outer flow containment member 112. For example, the primary inner containment member 150 could be constructed of non-porous material and include apertures 160, 162 for the flow of fluid therethrough along the lateral walls thereof.

In accordance with further embodiments, it is appreciated that various sections of the secondary inner flow containment member, the primary inner flow containment member, and the outer flow containment member, may be constructed with different porosities or with non-porous sections. By controlling the porosity of these members, it is possible to similarly control the flow of fluid through the flow suppression device. Still further, and through the utilization of porous fabrics in the construction of the flow suppression device, the flow suppression device also functions as a filter by retaining debris flushed out of the fluid system. It is important to examine any debris flushed out of the system to allow for examination and evaluation of the condition of the water supply to determine if additional flushing is required. Debris can easily clog sprinkler heads to prevent their effectiveness under use.

Figure 7:
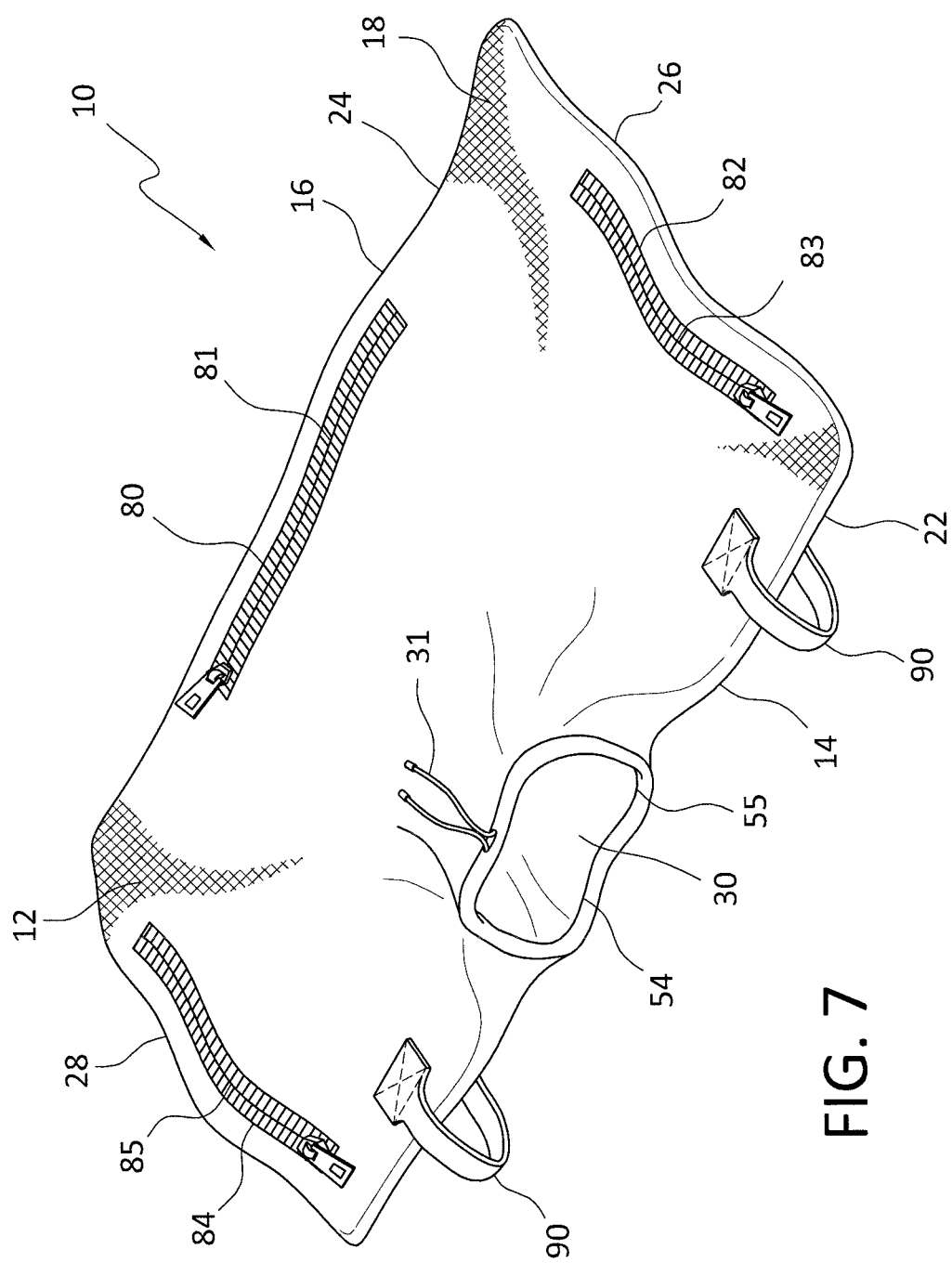
FIG. 7 is a perspective view of a flow suppression device in accordance with an alternate embodiment.
Figure 8:
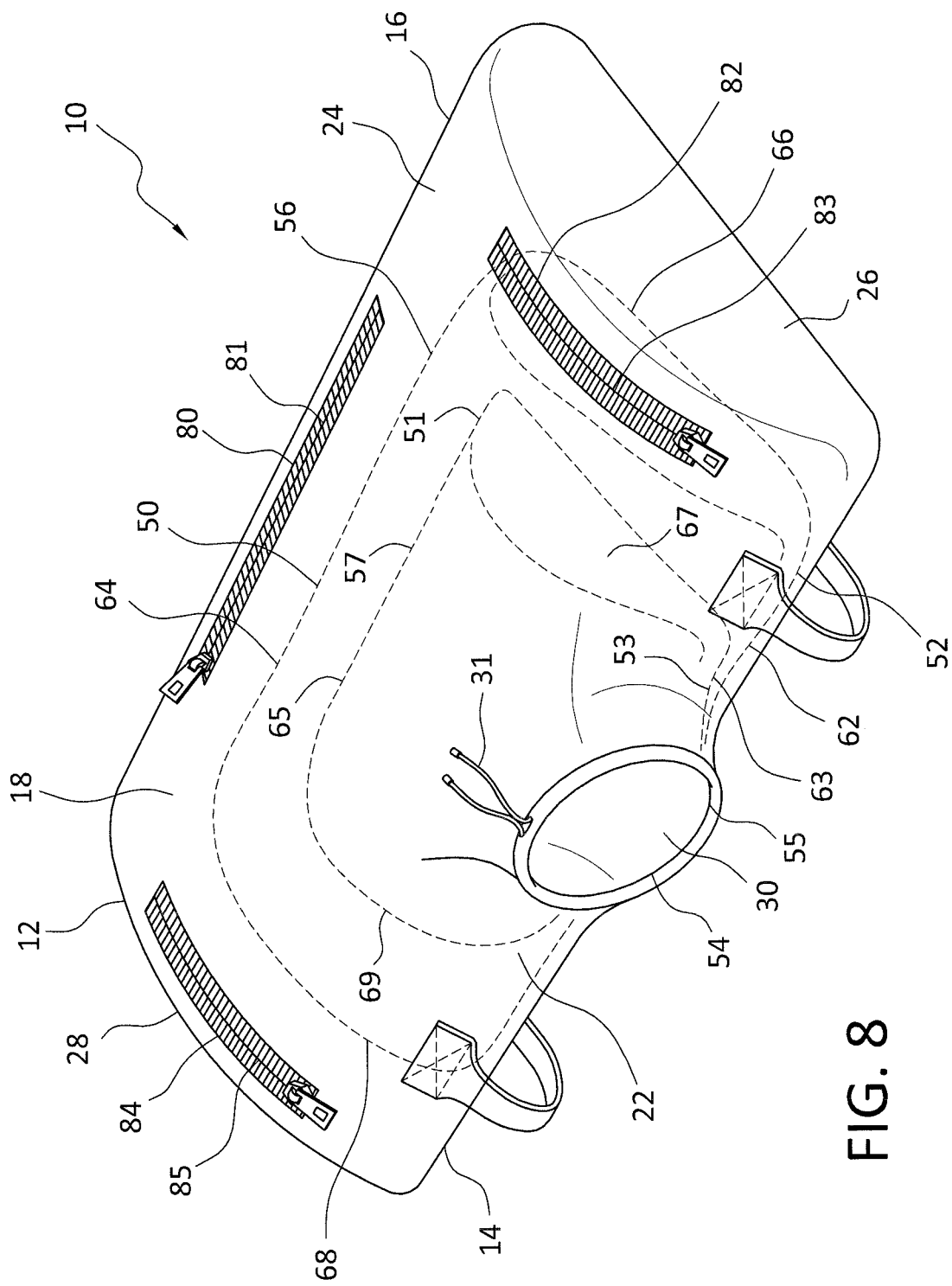
FIG. 8 is a top perspective view of the flow suppression device shown in FIG. 7.
Figure 9:
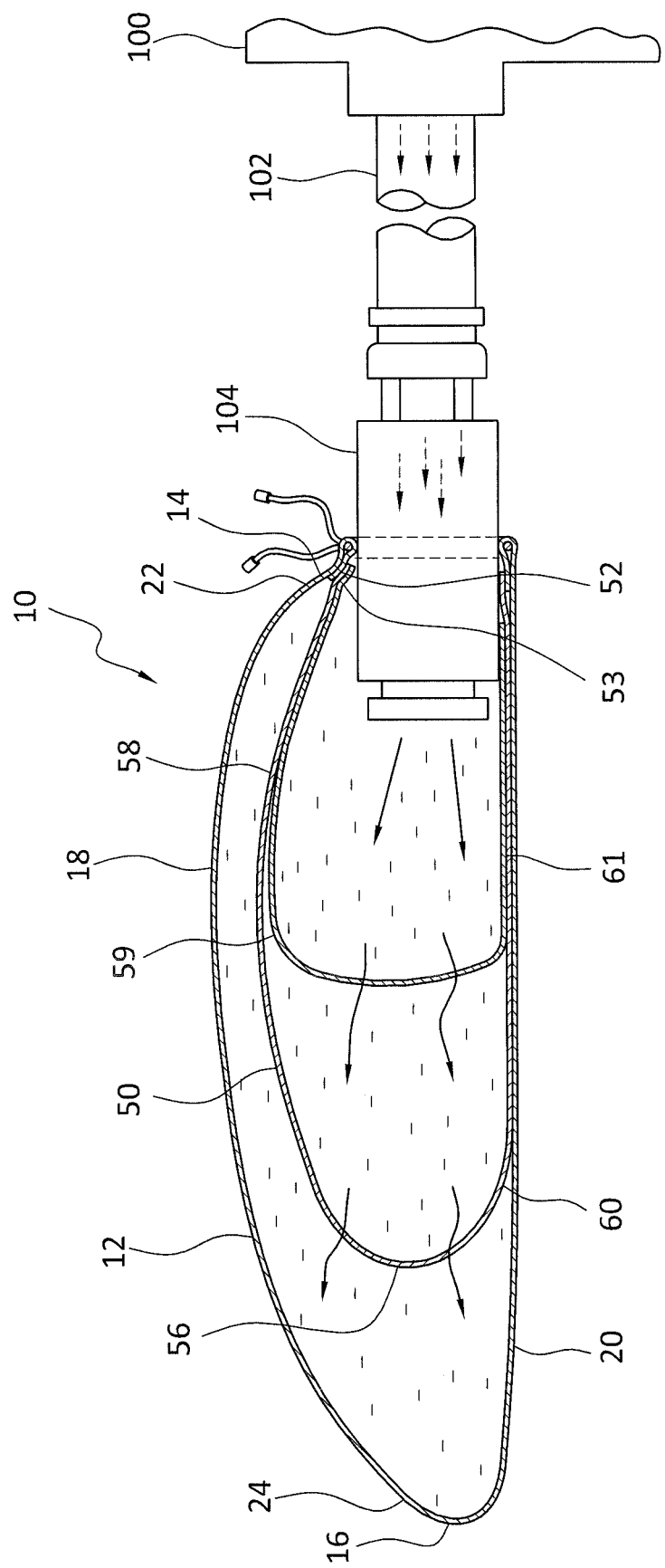
FIG. 9 is a side perspective view of a flow suppression device shown in FIG. 7 while the flow suppression device is in use.
Figure 10:
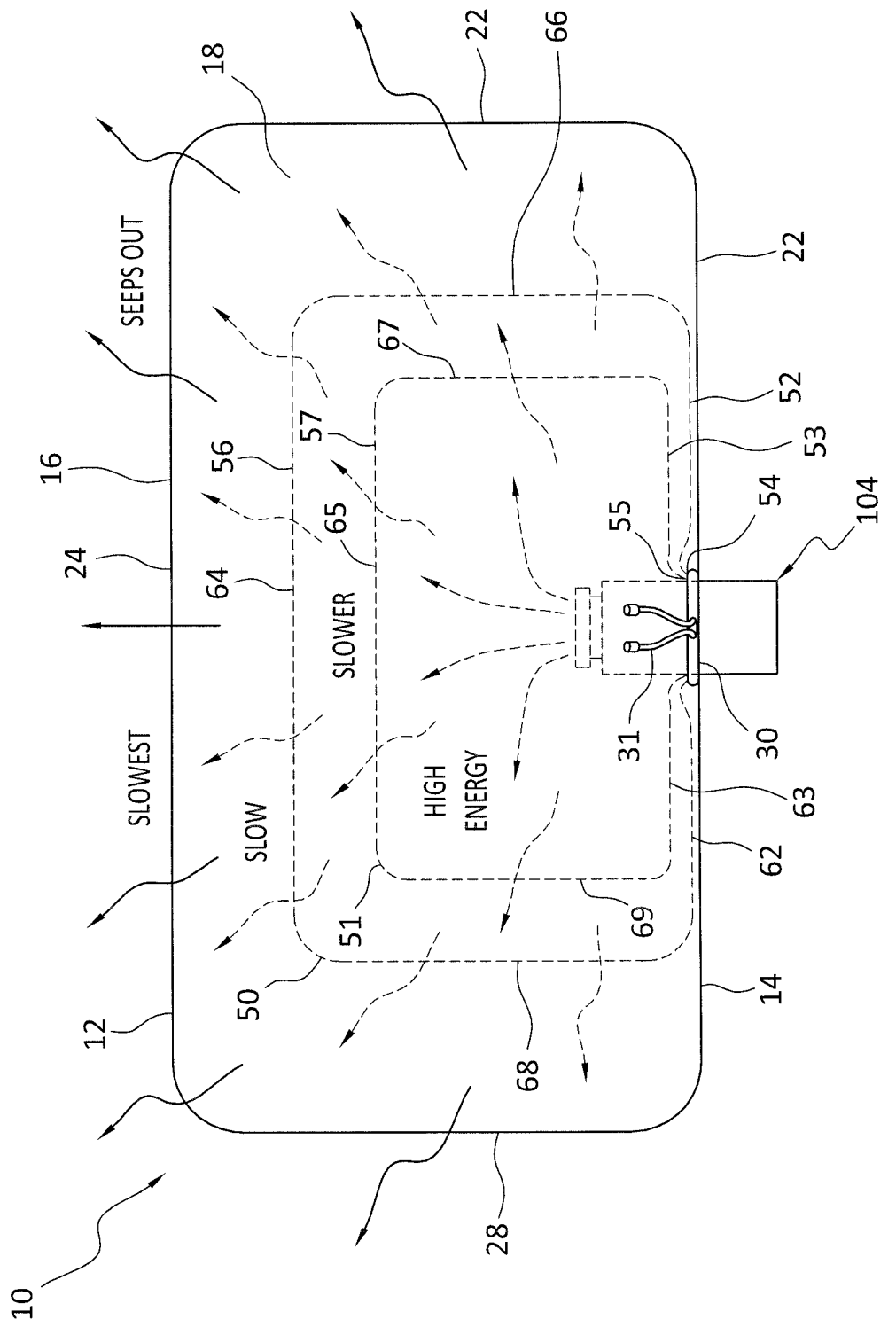
FIG. 10 is a top plan view of the flow suppression device shown in FIG. 7 showing the flow suppression device in use.
Figure 11:
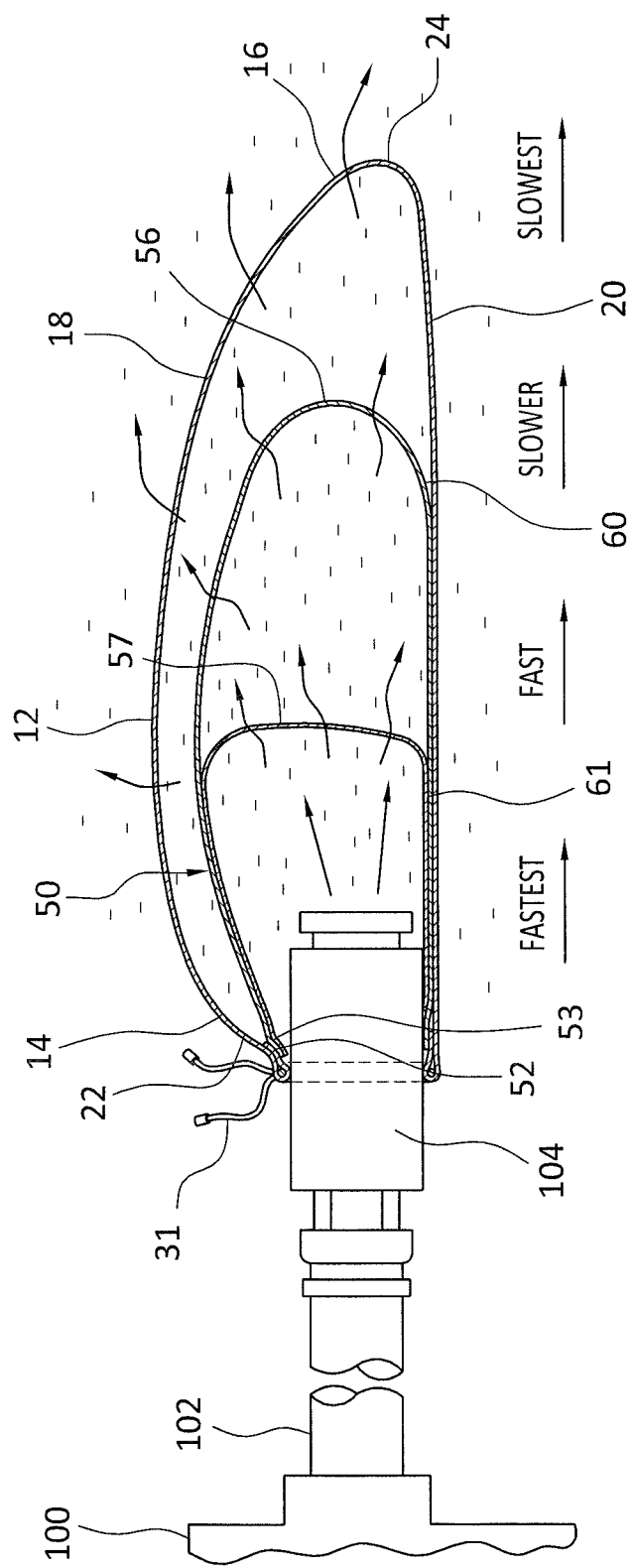
FIG. 11 is a cross-sectional view of the flow suppression device shown in FIG. 7 while the flow suppression device is in use.

Referring the embodiments shown in FIGS. 1 and 7, the flow suppression device 10 may also include handle(s) 90. The handle(s) 90 is connected to the upstream end 14 of the outer flow containment member 12.

De-chlorination can be accomplished by inserting de-chlorination tablets into the any of the containment members.

The flow suppression device provides virtual complete suppression of the exiting fluid flow to eliminate the potential of water damage from the exiting flow stream to the surrounding area. No longer is strategic device placement a critical component for safe and successful testing. The flow suppression device is designed to keep back wash of fluid coming out the inlet area for a clear and dry Pitot tube measurement by operating personnel.

The flow suppression device also allows for omni-directional or directed flow discharge. Anchoring of the flow suppression device is not reliant on opposing hydraulic forces to secure the unit. Rather, the weight of the fluid in the outer flow containment member serves as the anchoring principle if used as a stand-alone device. In addition, the flow suppression device is lighter and more compact due to its materials of construction. As explained above, the construction material is a fabric designed to withstand the force of the flow, provide for quick drying, and take up a minimal amount of storage space when transporting. The fabric flow suppression device eliminates most of the kinetic energy from fluid streams by directing the fluid back upon itself as it builds up a reservoir of fluid weight providing a self-anchor to suppress or convert the kinetic energy of the fluid forces. The discharge flow velocities are lowered to an amount to provide a calm exiting fluid stream. The flow suppression device also allows directable discharge from the device in any direction.

While the preferred embodiments have been shown and described, it will be understood that there is no intent to limit the invention by such disclosure, but rather, is intended to cover all modifications and alternate constructions falling within the spirit and scope of the invention.

The invention claimed is:

1. A flow suppression device adapted to be connected to a fire protection system when water is released to atmospheric pressure during pressure testing or flushing water from the fire protection system, comprising:

an outer flow containment member of a porous and flexible construction, the outer flow containment member having an upstream end and a downstream end opposite the upstream end, the upstream end including an inlet opening adapted to receive a flow stream of pressurized water from the fire protection system as it is released to atmospheric pressure;

a primary inner flow containment member of a porous and flexible construction contained within the outer flow containment member, the primary inner flow containment member having an upstream end with an inlet opening adjacent the inlet opening of the outer flow containment member and a downstream end opposite the upstream end of the primary inner flow containment member; and wherein the primary inner flow containment member is of a size to create a space between the primary inner flow containment member and the outer flow containment member which defines a cavity when filled with water prior to the water escaping the outer flow containment member to atmospheric pressure.

2. The flow suppression device according to claim 1, wherein the outer flow containment member is composed of a porous fabric bag having a first weave density.

3. The flow suppression device according to claim 1, wherein the downstream end of the outer flow containment member includes at least one selectively opened and closed opening.

4. The flow suppression device according to claim 1, wherein the outer flow containment member includes a top wall and a bottom wall connected by an upstream wall adjacent the upstream end of the outer flow containment member and a downstream wall adjacent the downstream end of the outer flow containment member, wherein all walls permit water flow to escape the walls while water is released from the fire protection system.

5. The flow suppression device according to claim 4, wherein the primary inner flow containment member includes a top wall and a bottom wall connected by an upstream wall adjacent the upstream end of the primary inner flow containment member and a downstream wall adjacent the downstream end of the primary inner flow containment member, wherein all walls permit water flow to escape the walls while water is released from the fire protection system.

6. The flow suppression device according to claim 1, wherein the inlet opening includes a plurality of carabiners shaped and dimensioned for selective engagement with connecting members of the fire protection system.

7. The flow suppression device according to claim 1, wherein the primary inner flow containment member is composed of a porous fabric bag.

8. The flow suppression device according to claim 1, wherein the inlet opening of the outer flow containment member and the inlet opening of the primary inner flow containment member are secured together and are coextensive to function as a single inlet opening.

9. The flow suppression device according to claim 8, further including a secondary inner flow containment member of a porous and flexible construction contained within the primary inner flow containment member, the secondary inner flow containment member includes an upstream end with an inlet opening adjacent the inlet opening of the outer flow containment member and a downstream end opposite the upstream end, and the inlet opening of the secondary inner flow containment member and the inlet opening of the outer flow containment member are secured together and are coextensive.

10. The flow suppression device according to claim 1, further including a secondary inner flow containment member of a porous and flexible construction contained within the primary inner flow containment member, the secondary inner flow containment member includes an upstream end with an inlet opening adjacent the inlet opening of the outer flow containment member and a downstream end opposite the upstream end.

11. The flow suppression device according to claim 10, wherein the secondary inner flow containment member is composed of a porous fabric bag having a second weave density.

12. The flow suppression device according to claim 10, wherein the inlet opening of the secondary inner flow containment member and the inlet opening of the outer flow containment member are secured together and are coextensive to function as a single inlet opening.

13. The flow suppression device according to claim 1, wherein the outer flow containment member has a first porosity and the primary inner flow containment member has a second porosity which is different from the first porosity, such that due to a difference in porosity the cavity will fill with water until a specific pressure is reached at which time the water will then flow through the outer flow containment member.

14. The flow suppression device according to claim 13, wherein the second porosity is less than the first porosity.

15. A flow suppression device adapted to be connected to a fire protection system when water is released to atmospheric pressure during pressure testing or flushing water from the fire protection system, comprising:

an outer flow containment member of a porous and flexible construction, the outer flow containment member having an upstream end with an upstream wall and a downstream end with a downstream wall opposite the upstream wall, the upstream wall including an inlet opening adapted to receive a flow stream of pressurized water from the fire protection system;

a primary inner flow containment member of a porous and flexible construction contained within the outer flow containment member, the primary inner flow containment member having an upstream end with an upstream wall having an inlet opening adjacent the inlet opening of the outer flow containment member and a closed downstream end opposite the upstream end of the primary inner flow containment member; and wherein the outer flow containment member includes at least one selectively opened and closed opening.

16. The flow suppression device according to claim 15, wherein the at least one selectively opened and closed opening is located on the downstream wall of the outer flow containment member.

17. The flow suppression device according to claim 15, wherein the at least one selectively opened and closed opening is not located on the downstream wall of the outer flow containment member.

18. The flow suppression device according to claim 15, wherein the outer flow containment member has a first porosity and the primary inner flow containment member has a second porosity which is different from the first porosity.

* * * * *